US008177569B1

(12) United States Patent
Dozier et al.

(10) Patent No.: US 8,177,569 B1
(45) Date of Patent: May 15, 2012

(54) HEAT SINK FOR A THERMALLY EFFICIENT BUSWAY JOINT PACK

(75) Inventors: Steven Wayne Dozier, Murfreesboro, TN (US); Matthew A Williford, Nashville, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 0 days.

(21) Appl. No.: 12/974,984

(22) Filed: Dec. 21, 2010

(51) Int. Cl.
*H01R 4/60* (2006.01)
(52) U.S. Cl. ........................................ 439/213
(58) Field of Classification Search .................. 439/213; 174/68.2
See application file for complete search history.

(56) References Cited

U.S. PATENT DOCUMENTS

| | | | | |
|---|---|---|---|---|
| 3,028,460 | A * | 4/1962 | Turton | 200/51 R |
| 3,365,537 | A * | 1/1968 | Fehr, Jr. et al. | 174/88 B |
| 3,376,377 | A * | 4/1968 | Fehr, Jr. | 174/72 B |
| 4,627,680 | A * | 12/1986 | Weimer et al. | 439/210 |
| 4,979,906 | A * | 12/1990 | Shrout et al. | 439/213 |
| 5,122,072 | A | 6/1992 | Arn | |
| 5,401,906 | A * | 3/1995 | Bryant | 174/88 B |
| 5,486,651 | A * | 1/1996 | Morgan | 174/68.2 |
| 5,760,339 | A * | 6/1998 | Faulkner et al. | 174/88 B |
| 5,821,464 | A * | 10/1998 | Graham et al. | 174/86 |
| 6,180,885 | B1 * | 1/2001 | Goldman et al. | 174/68.2 |
| 6,329,598 | B1 * | 12/2001 | M'Sadoques et al. | 174/68.2 |
| 7,817,428 | B2 | 10/2010 | Greer, Jr. | |
| 7,819,681 | B1 | 10/2010 | Rodrigues | |
| 7,862,356 | B1 * | 1/2011 | O'Leary et al. | 439/213 |
| 2010/0059276 | A1 * | 3/2010 | Bhathija et al. | 174/99 B |

FOREIGN PATENT DOCUMENTS

| | | |
|---|---|---|
| WO | W096/29768 | 9/1996 |
| WO | W096/29769 | 9/1996 |

OTHER PUBLICATIONS

Web pages printed from Intranet website http://www.cheresources.com/htpipes.shtml, titled "What is a Heat Pipe?", (downloaded Dec. 21, 2010) 10 pages.
Web pages printed from Intranet website http://www.amecthermasol.co.uk/AmecThermasolFlatCoolPipes.html, titled "Amec Thermosol Heat Management and Thermal Control Solutions", (downloaded Dec. 21, 2010) 6 pages.

* cited by examiner

*Primary Examiner* — Tulsidas C Patel
*Assistant Examiner* — Vladimir Imas
(74) *Attorney, Agent, or Firm* — Roland W. Norris (57) ABSTRACT

A busway joint pack for joining busway conductor sections has a heat sink assembly with an interstitial heat sink portion sized to fit between its connector plates; an exterior heat sink portion projecting beyond the exterior surface of a side panel of the joint pack; with the interstitial heat sink portion having thermal conduction to the exterior heat sink portion; to attain cooler operation. The heat sink may include thermally conductive dielectric materials or metals, or both, or other thermally conductive materials used with the thermally conductive dielectric materials.

19 Claims, 6 Drawing Sheets

FIG. 1
(Known Art)

HEAT SINK FOR A THERMALLY EFFICIENT BUSWAY JOINT PACK

FIELD OF THE INVENTION

The present invention relates generally to electrical distribution equipment and, more particularly, to thermally efficient busway joint packs.

BACKGROUND OF THE INVENTION

A busway system is a prefabricated modular electrical power delivery system which typically includes two or more busways, one or more busway joint packs, and may include a plurality of plug-in units. Each busway includes one or more phase-conductors and a housing. For example, in a three phase system, the busway can include three live phase-conductors or three live phase-conductors and one neutral-conductor, depending on the type of system architecture being employed. If required, various plug-in units or electrical components can be directly connected to one or more plug-in connection sites spaced along the busways to draw power. Each busway joint pack is used to physically and electrically connect two sections of busway together.

A common problem in busway systems is the management of the rise in temperature of the busway system within the busway joint pack. A rise in temperature within the busway joint pack limits the overall thermal performance of the busway system, which directly affects the required size of the busway and/or the size of the phase-conductors. Using larger phase-conductors to accommodate the rise in temperature at the busway joint pack increases the size of, and accordingly the costs of, the materials needed to make the busway system. As phase-conductors are typically made of copper and/or aluminum, which can be expensive, such a solution can be expensive. Another problem caused by the rise in temperature at the busway joint pack is a potential degradation of the busway system due to excessive heat, melting, deformation, etc.

Thus, a need exists for an improved apparatus and system. The present disclosure is directed to satisfying one or more of these needs and solving other problems.

SUMMARY

The present disclosure is directed to providing a heat sink for a thermally efficient busway joint pack. The thermally efficient busway joint pack is configured to passively transfer thermal energy or heat from its core to the outside of an exterior housing of the busway such that the thermal energy is lost or transferred to the surrounding environment, which reduces the internal temperature of the joint pack. The joint pack includes a pair of opposing conductive phase connector plates defining a space therebetween for accepting a busway phase conductor; a first side panel for the joint pack having an interior surface and an exterior surface; and a heat sink assembly for the joint pack having an interstitial heat sink portion sized to fit between the phase connector plates; an exterior heat sink portion projecting beyond the exterior surface of the side panel; with the interstitial heat sink being physically connected and hence thermally conductive to the exterior heat sink portion. The exterior heat sink portion may include cooling fins.

Each of the interstitial portions and the exterior heat sink portions may include metal or thermally conductive dielectric material, or both, with the metal clad in thermally conductive dielectric material where necessary. Other aspects of the invention may use micro heat pipe in place of metal, with similar thermally conductive dielectric material cladding.

The foregoing and additional aspects and embodiments of the present disclosure will be apparent to those of ordinary skill in the art in view of the detailed description of various disclosed examples and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
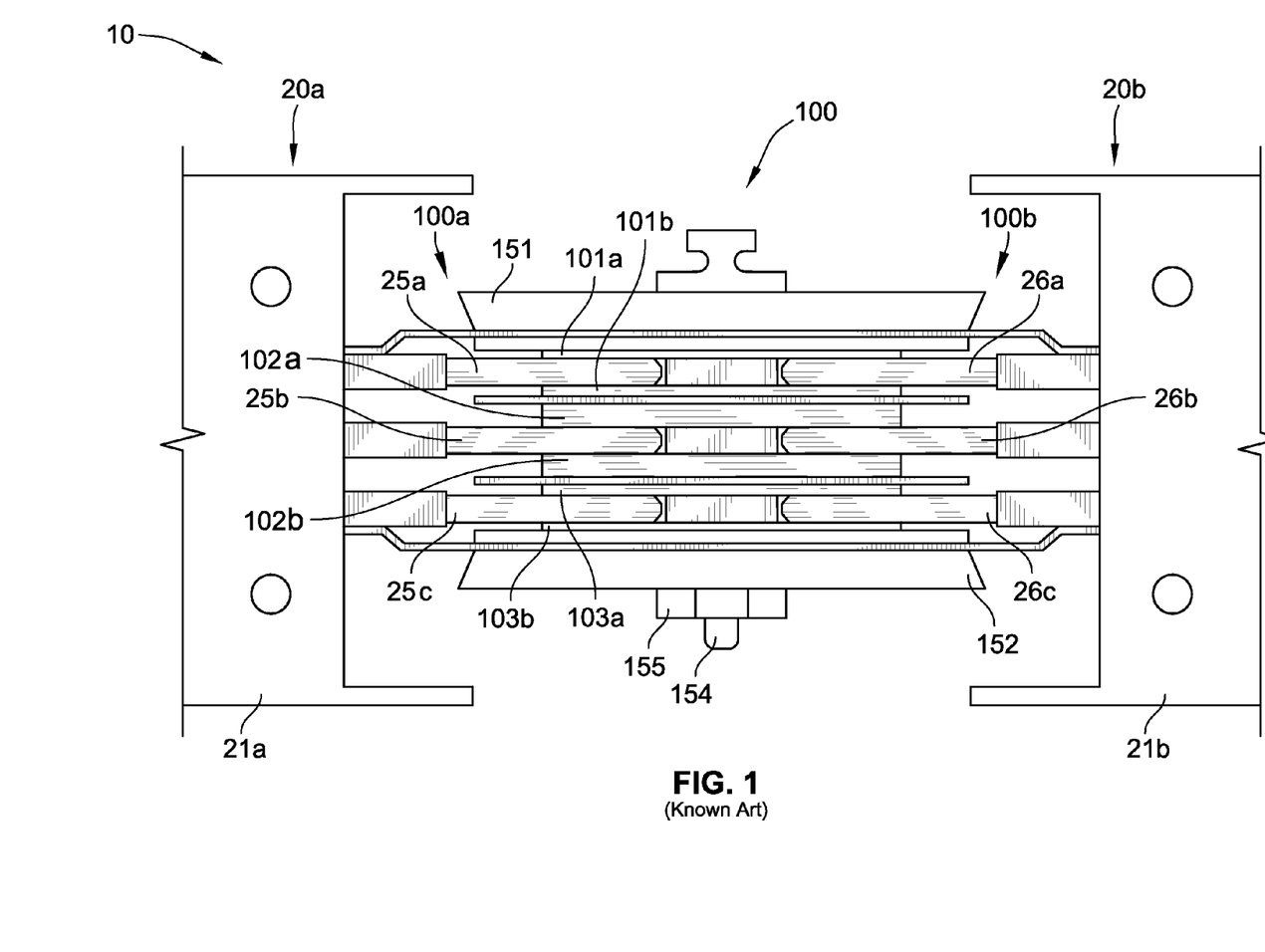
FIG. 1 is a partial cutaway side view of a known busway system for general edification.

Referring to FIG. 1, an exemplary known busway system 10 is shown for general exposition of joint pack parts and the environment of the present invention. The busway system 10 includes a joint pack 100, with its side panels removed for ease of view interior parts, a first busway section 20a, and a second busway section 20b. The first and the second busway sections 20a,b are three pole busways and/or three phase busways. The first busway section 20a includes a busway housing 21a and three phase-conductors 25a-c. Each of the phase-conductors 25a-c are electrically insulated from each other and the housing 21a. Each of the phase-conductors 25a-c have at least one exposed end configured to physically and electrically mate with a first end 100a of the joint pack 100, as shown in FIG. 1.

Similarly, the second busway section 20b includes a busway housing 21b and three phase-conductors 26a-c. Each of the phase-conductors 26a-c are electrically insulated from each other and the housing 21b. Each of the phase-conductors 26a-c have at least one exposed end configured to mate with a second opposing end 100b of the joint pack 100 in the same manner as the three phase conductors 25a-c mate with the first end 100a. The joint pack 100 is configured such that when the first busway section 20a and the second busway section 20b are both physically engaged with the joint pack 100, as shown in FIG. 1, the joint pack 100 electrically couples each of the three phase conductors 25a-c with a respective one of the phase-conductors 26a-c of the second busway section 20b. For example, the first phase-conductor 25a of the first busway section 20a is electrically connected with the first phase-conductor 26a of the second busway section 20b. As known in the art, busway sections will typically accommodate between one and four poles i.e., conductor phases. The joint pack components are coupled and compressed together with a bolt 154 and a nut 155, and often a compression washer (not shown), compressing top and bottom plates 151, 152, respectively, as typical in the art.

Within the joint pack 100 there are pairs of opposing connector plates 101, 102, and 103, where each pair corresponds to a particular electrical phase of the joint pack 100 and electrically joins the phase conductors, collectively 25 and 26, of separate busway sections together. The first pair of opposing connector plates 101 corresponds to phase A, the second pair of opposing connector plates 102 corresponds to phase B, and the third pair of opposing connector plates 103 corresponds to phase C.

Each of the pairs of opposing connector plates 101, 102, and 103 defines a respective space therebetween for receiving a phase-conductor of a busway, such as one of the phase-conductors 25a-c, 26a-c shown in FIG. 1. The first pair of opposing connector plates 101 includes a first phase connector plate 101a and a second phase connector plate 101b. Similarly, the second pair of opposing connector plates 102 includes a first phase connector plate 102a and a second phase connector plate 102b, and the third pair of opposing connector plates 103 includes a first phase connector plate 103a and a second phase connector plate 103b.

Figure 2:
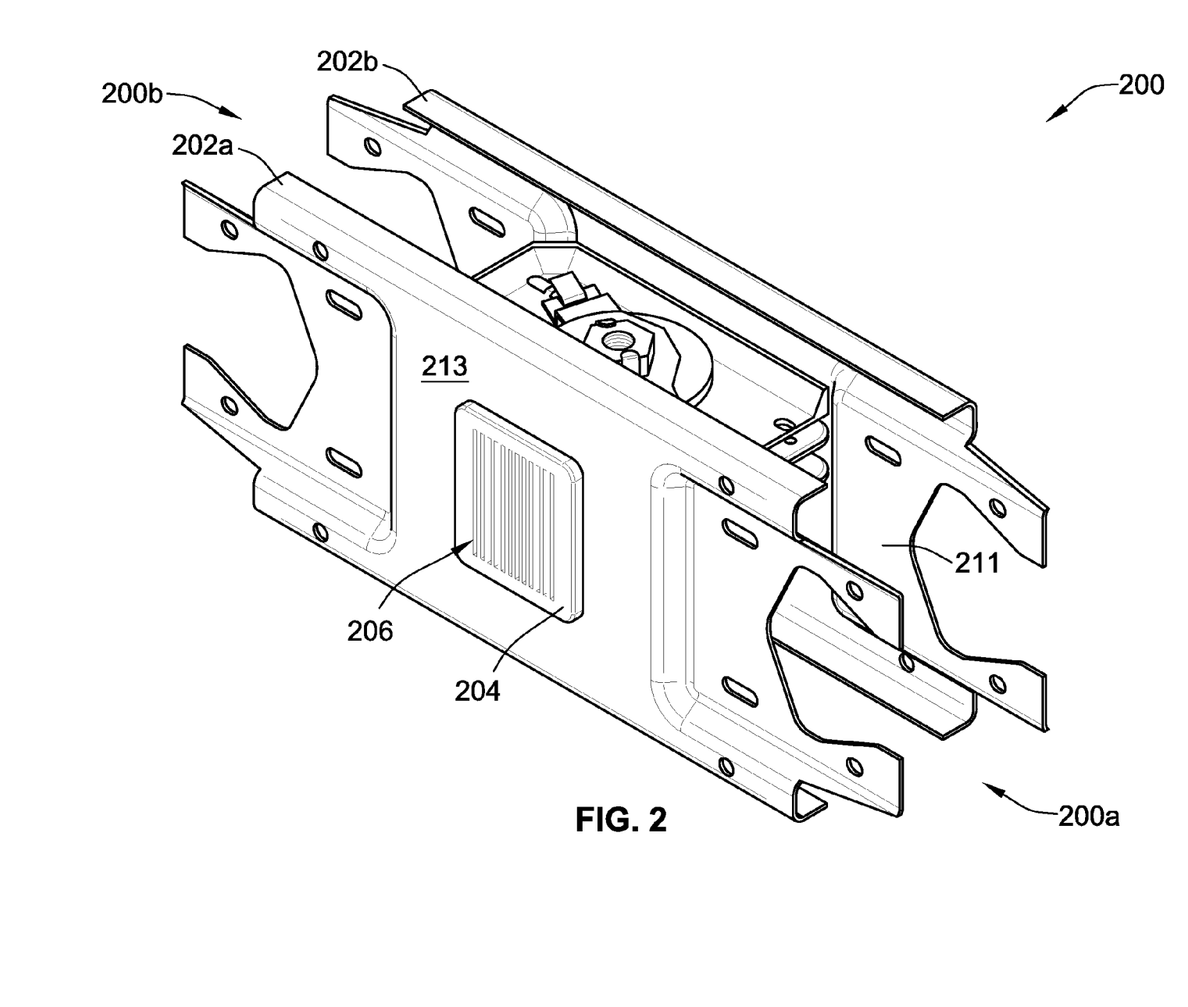
FIG. 2 is a top perspective view of a joint pack according to one aspect of the invention.
Figure 3:
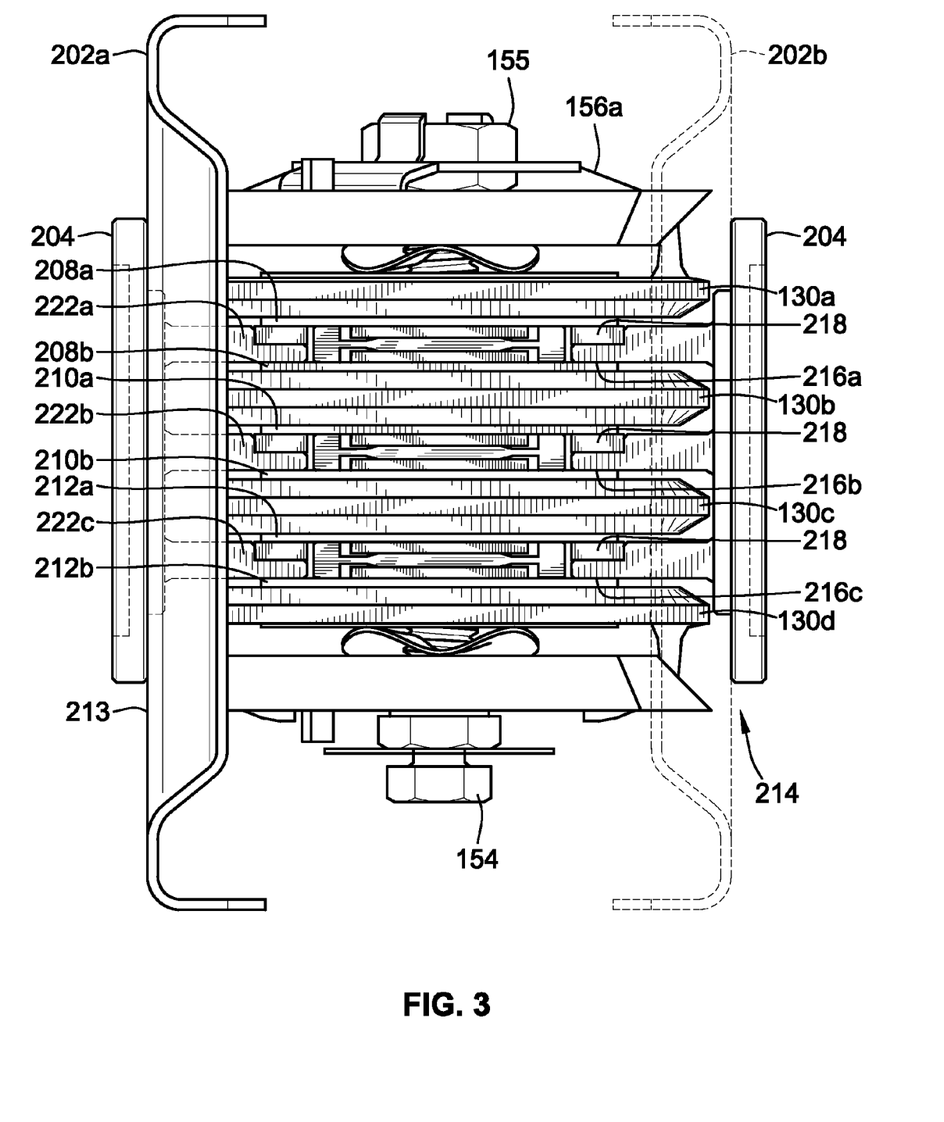
FIG. 3 is a simplified end view of FIG. 2 with one side panel removed for clarity.

Referring generally to FIGS. 2-3, an exterior view of a joint pack 200 according to one exemplary aspect of the present disclosure is shown. The joint pack 200 is a multi-phase joint pack, in this case, a three-phase joint pack. The joint pack 200 is generally cube-shaped having the first end 200a and the second opposing end 200b for receiving sections of busway conductors, as is typical. The joint pack 200 has a first side panel 202a (FIGS. 2 and 3), and a second opposing side panel 202b (FIG. 2) providing exterior protective surfaces of the joint pack. Extending through the first side wall 202a is an exterior heat sink portion 204 of a heat sink assembly, comprising thermally conductive dielectric material with integral heat sink cooling fins collectively 206, as further explained below. Each side panel 202a and 202b has an exterior surface 213 and an interior surface 211 of the side panels.

It will be appreciated that parts of the joint pack not necessary to an explanation of the present invention may be shown but not discussed herein and the typical function and composition of such parts will be understood by the person having ordinary skill in the art.

FIG. 3 is an end view, e.g. end 200a with one side panel 202b, phantomed for clarity of explanation. At the right side of the drawing is a heat sink assembly 214 having interstitial portions 216a, 216b, 216c between each pair of phase connector plates 208a, 208b; 210a, 210b; and 212a, 212b. Four insulating plates 130a-d are placed so as to surround each phase connector plate pair. In this embodiment, the interstitial portions touch only the lower connector plate of the pair 208b, 210b, 212b, respectively. Heat sink pads, collectively 218, are compressed between each interstitial portion 216 and the corresponding top connector plate 208a, 210a, 212a. The heat sink pads 218 may be thermally conductive dielectric material such as Gap Pad® material 5000S35 or 2200SF of appropriate thickness, such as from Berquist Company of Minnesota, and provide compressibility within the joint pack heat sink system if needed. The heat sink assembly 214 in this embodiment may be molded from all thermally conductive dielectric material such as CoolPoly® PPS D5108 from Cool Polymers, Inc. of Rhode Island.

By way of example, the cited heat sink pad material can have a thermal conductivity of 2 Watts per Kelvin per meter (W/m-K) at 125 mil thickness. The CoolPoly D5108, a thermally conductive polyphenylene sulfide (PPS) has a thermal conductivity of 10 W/m-K and a dielectric strength twenty nine kilovolt per millimeter (KV/mm). It will be appreciated by the person of skill in the art that various materials might be used as the thermally conductive dielectric material having a range of dielectric strength and thermal conductivity attributes suitable for the intended purpose.

Figure 4A:
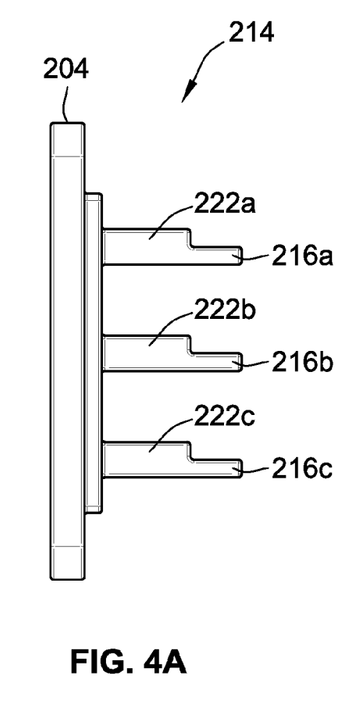
FIG. 4A is a side view of a heat sink assembly made of thermally conductive dielectric material.

Noting that the left and right sides of the joint pack are mirror images of one another, as seen on the left side of FIG. 3, the side panel 202a is in place and the interstitial portions collectively 216 of the heat sink assembly are joined to interior extension portions 222a, 222b, and 222c, remaining inside of the side wall 202a interior surface. That is, the heat sink assembly of the present disclosure represents a joined mass where all parts are in contact to achieve thermal distribution conductively, i.e. through conduction, although within some components in some aspects of the heat sink assembly, such as the micro heat pipe aspects described below, convection may take place also. It will be appreciated that, while the present example shows an interstitial portion for each phase, the present invention contemplates that less than every phase may require an interstitial portion for adequate cooling of the joint pack. Reference may also be had to FIG. 4A, where the heat sink assembly 214 is shown separated from its joint pack. The interior extension portions collectively 222 may be of a thickness approximately equal to a busway conductor, i.e. the gap between the connector plate pair of the joint pack, for increased thermal and structural mass. The interior extension portions 222 then pass through an aperture in the side panel 202a and broaden into the exterior heat sink portion 204, which may be a rectangular plate-like mass, to extend beyond the exterior surface 213 of the side panels 202 and into the ambient environment.

Figure 4B:
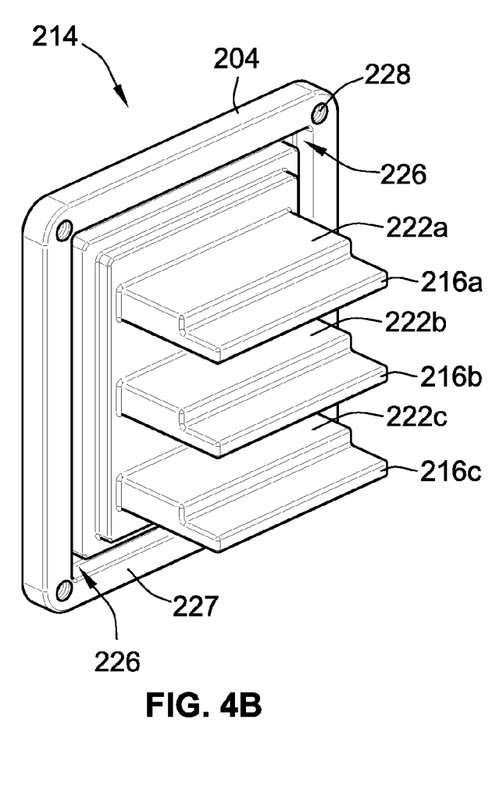
FIG. 4B is a perspective view from the interior side of the heat sink assembly of FIG. 4A.
Figure 4C:
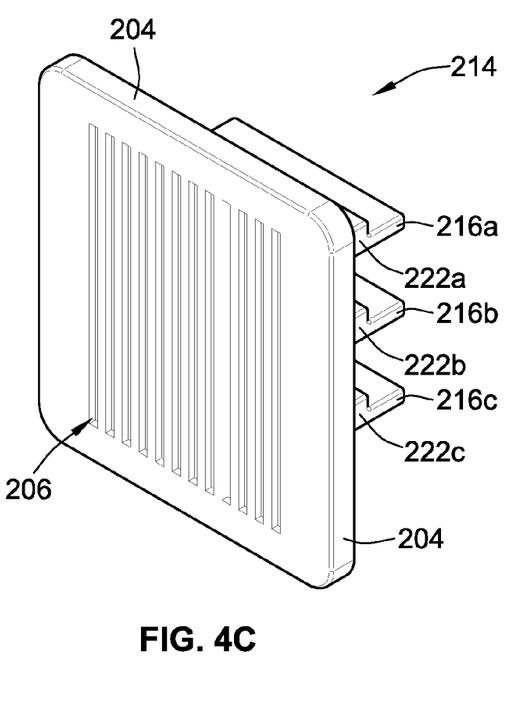
FIG. 4C is a perspective view from the exterior side of the heat sink assembly of FIG. 4A.

As seen in FIG. 4B the interior surface 227 of the exterior heat sink portion 204 which abuts the exterior surface 213 of the side panels 202 (FIGS. 2-3) may have a molded in groove 226 for a sealing gasket (not shown) and tapped holes 228 at each corner for receiving mounting screws from inside the side panels 202. The front view of FIG. 4C shows the exterior heat sink portion 204 with integrally molded cooling fins 206.

Figure 5:
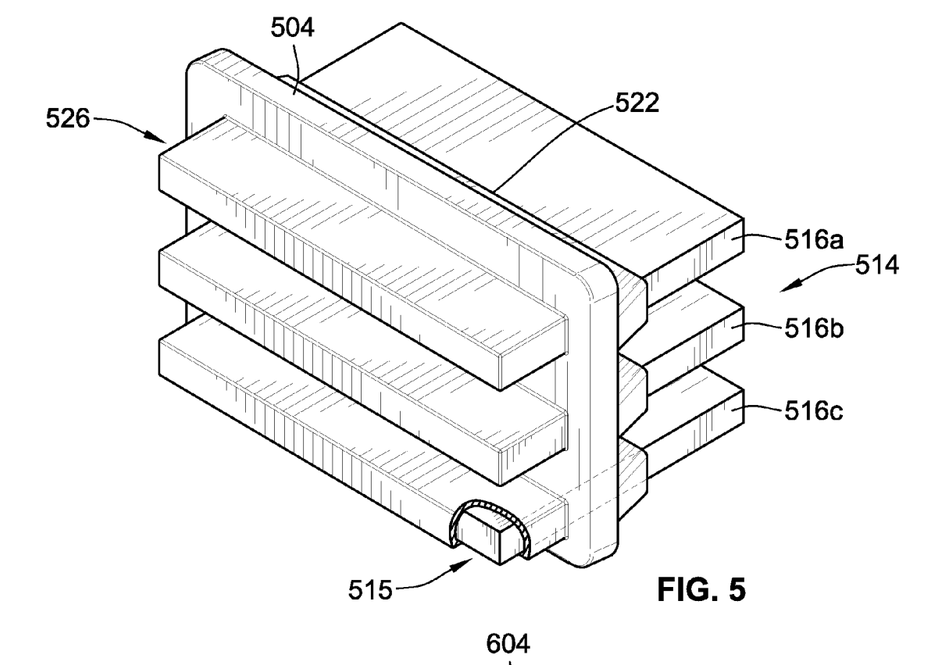
FIG. 5 is a front, or exterior side, perspective view of an alternative aspect of a heat sink assembly of the invention with exposed metal interstitial portions and thermally conductive dielectric material clad exterior portions.
Figure 6:
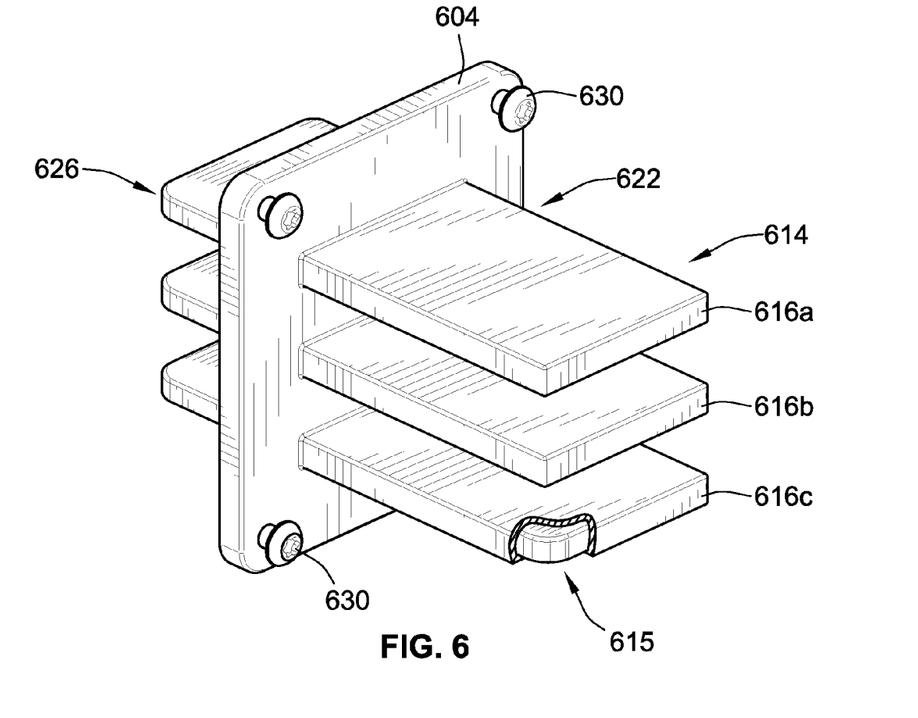
FIG. 6 is a rear, or interior side, perspective view of an alternative aspect of a heat sink assembly of the invention with thermally conductive dielectric material clad metal interstitial portions and exposed metal exterior fin portions.

As seen in FIG. 5, an alternative version of the heat sink assembly 514 may have interstitial portions, 516a-c, formed of unclad bare metal, here of a uniform thickness to be placed between the connector plate pairs 208, 210, 212 (FIG. 3), without additional heat sink pads, and leading into broadened interior extension portions 522 which are clad in thermally conductive dielectric material and lead into the exterior heat sink portion 504 which comprises a plate-like mass of thermally conductive dielectric material substantially orthogonal to the interstitial portions 516 and interior extension portions 522. The bare metal forming the interstitial portions continues out beyond the orthogonal plate of the exterior heat sink portion 504 to form cooling fins 526 also clad in thermally conductive dielectric material as shown by the cutaway at 515. The cooling fins will be considered part of the exterior heat sink portion 504. By utilizing bare metal and cladding it with thermally conductive dielectric material only where necessary for the dielectric properties, heat may be quickly conducted from the interior of the joint pack As seen in FIG. 6, another alternative version of the heat sink assembly 614 may have interstitial portions, 616a-c, formed of metal clad in thermally conductive dielectric material as shown by the cutaway at 615, here of a uniform thickness to be placed between the connector plates 208, 210, 212 (FIG. 3), without additional heat sink pads, and leading without broadening, into the interior extension portions 622 which are also clad in thermally conductive dielectric material and lead into the exterior heat sink portion 604 which comprises a plate-like mass of thermally conductive dielectric material substantially orthogonal to the interstitial portions 616 and interior extension portions 622. The flat metal bars forming the interior of the interstitial portions 616 continue out beyond the orthogonal plate of the exterior heat sink portion 604 as bare metal to form cooling fins 626 not clad in thermally conductive dielectric material. The cooling fins 626 will be considered part of the exterior heat sink portion 626. The cooling fins may extend in various manners and include bends therein to increase thermal transfer. Mounting screws 630 are shown inserted into tapped holes at the corners of the exterior heat sink portion 626 for secure mounting to the side panels 202 (FIG. 2). Again, by utilizing bare metal and cladding it with thermally conductive dielectric material only where necessary for the dielectric properties, heat may be quickly dispersed to the ambient air.

Figure 7A:
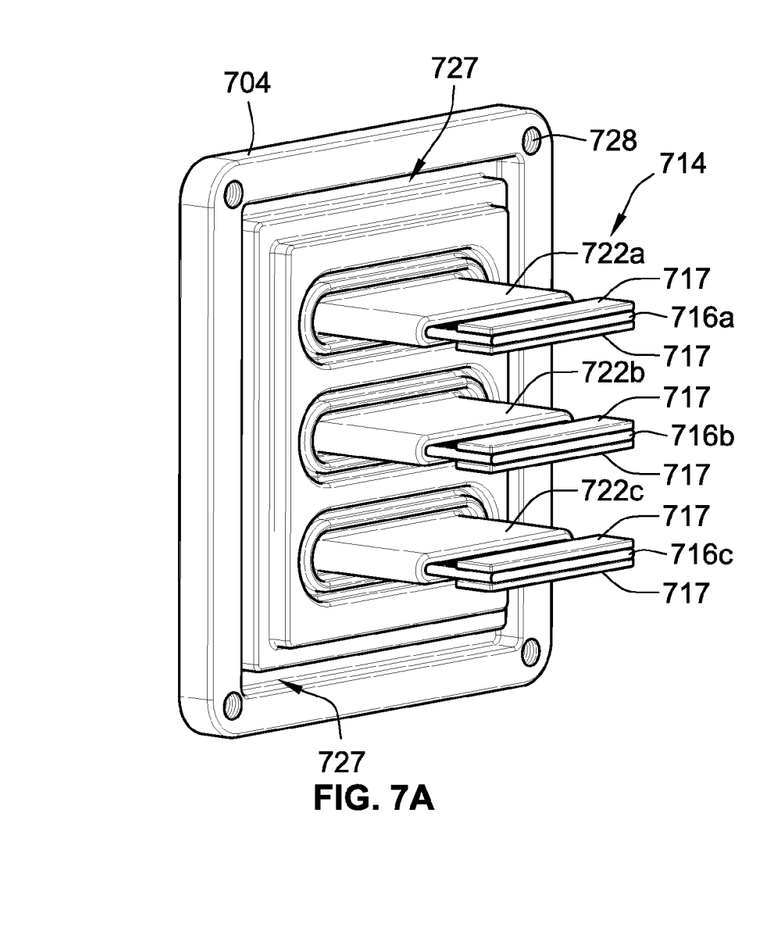
FIG. 7A is a rear, or interior side, perspective view of an alternative aspect of a heat sink assembly of the invention with thermally conductive dielectric material clad micro heat pipe interstitial portions.
Figure 7B:
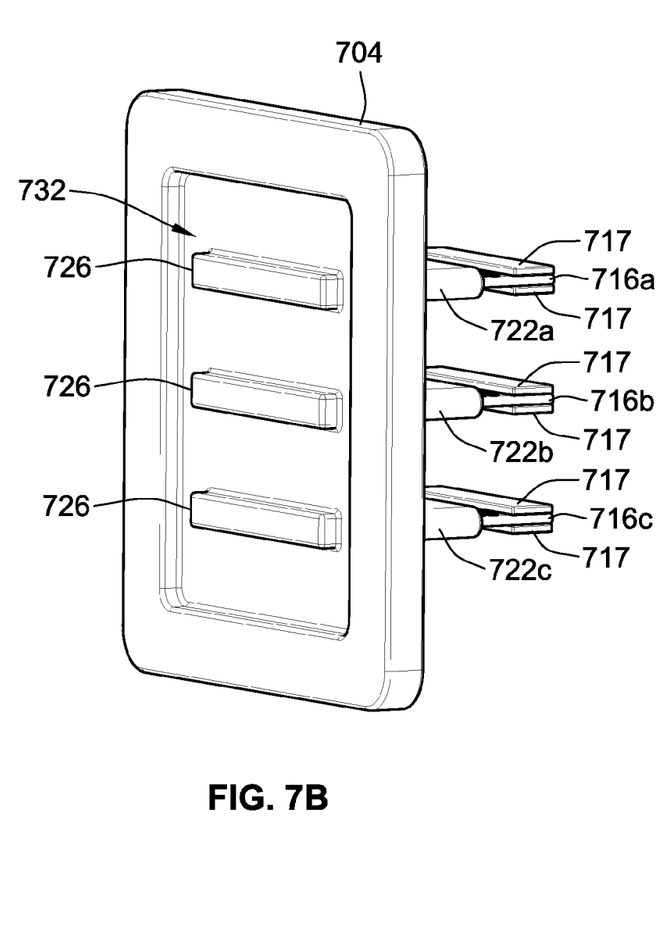
FIG. 7B is a front, or exterior side, perspective view of the heat sink assembly of FIG. 7A.

As seen in FIG. 7A, another alternative version of the heat sink assembly 714 may have interstitial portions, 716a-c, formed of unclad micro heat pipe material, here of a uniform thickness but much thinner that the distance between the connector plate pairs 208, 210, 212 (FIG. 3) due its superior heat transfer characteristics. An exemplary micro heat pipe material may be e.g., part number: MHP-2550A150A from Amec Thermasol Heat Management and Thermal Control Solutions. An additional heat sink pad, collectively 717, is used as a compressible interface with the connector plates on each side of the micro heat pipe material. The interstitial portions 716 of unclad micro heat pipe material lead, without thickening or broadening, into the interior extension portions 722 which are clad in thermally conductive dielectric material and lead into the exterior heat sink portion 704 which comprises a plate-like mass of thermally conductive dielectric material substantially orthogonal to the interstitial portions 716 and interior extension portions 722. Referencing also FIG. 7B, the bars of micro heat pipe material forming the interior of the interior extension portions 722 continue into a recessed area 732 of the exterior of the orthogonal plate of the exterior heat sink portion 704 to form short cooling fins collectively 726 within the recessed area 732 and still clad in thermally conductive dielectric material for increased protection of the micro heat pipe bars. The short cooling fins 726 will be considered part of the exterior heat sink portion 704. As seen in FIG. 7A, like the disclosed example of FIG. 4B, on the interior surface there is a molded-in groove 727 for a sealing gasket (not shown) and tapped holes 728 at each corner for receiving mounting screws from inside the side panels 202 (FIG. 2). By utilizing micro heat pipe material and cladding it with thermally conductive dielectric material only where necessary for structural or dielectric properties, or both, heat may be quickly dispersed to the ambient air.

A reduction of internal joint pack temperature is advantageous at least because it improves the thermal performance of the busway system, which directly affects the size of the phase-conductors needed in the busway sections. Thus, an improvement of thermal performance of the busway system allows for the use of phase-conductors having smaller cross-sectional areas and/or an overall smaller busway architecture. Smaller and/or lighter phase-conductors can significantly reduce the cost of fabrication as many phase-conductors are made from relatively expensive metals, such as copper and/or aluminum. As such, even a small reduction in cross-sectional area of a phase-conductor can result in a reduction in cost of a busway system.

While particular aspects, disclosed examples, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A busway joint pack, comprising:
a pair of phase connector plates defining a space therebetween for accepting a busway phase conductor;
a first side panel for the joint pack having an interior surface and an exterior surface; and
a heat sink assembly for a joint pack having:
an interstitial heat sink portion sized to fit between the phase connector plates;
an exterior heat sink portion projecting beyond the exterior surface of the side panel; and
the interstitial heat sink portion being thermally conductive to the exterior heat sink portion.

2. The joint pack of claim 1 wherein
the exterior heat sink portion is further in contact with the exterior surface of the first side panel.

3. The joint pack of claim 1 wherein
the exterior heat sink portion is joined to the interstitial heat sink portion by an interior extension portion therebetween.

4. The joint pack of claim 1 wherein
the exterior heat sink portion includes thermally conductive dielectric material.

5. The joint pack of claim 1 wherein
the exterior heat sink portion includes metal.

6. The joint pack of claim 1 wherein
the exterior heat sink portion includes micro heat-pipe.

7. The joint pack of claim 1 wherein
the exterior heat sink portion includes metal clad in thermally conductive dielectric material.

8. The joint pack of claim 1 wherein
the exterior heat sink portion includes exposed metal.

9. The joint pack of claim 1 wherein
the exterior heat sink portion includes a cooling fin.

10. The joint pack of claim 1 wherein
the exterior heat sink portion includes a plurality of cooling fins.

11. The joint pack of claim 1 further including
a compressible heat sink pad placed against the interstitial heat sink portion.

12. The joint pack of claim 1 wherein
the interstitial heat sink portion includes metal.

13. The joint pack of claim 1 wherein
the interstitial heat sink portion includes thermally conductive dielectric material.

14. The joint pack of claim 1 wherein
the interstitial heat sink portion includes micro heat pipe.

15. The joint pack of claim 1 wherein
the interstitial heat sink portion includes metal clad in thermally conductive dielectric material.

16. The joint pack of claim 1 wherein
the interstitial heat sink portion includes micro heat-pipe clad in thermally conductive dielectric material.

17. The joint pack of claim 1 wherein the first side panel is apertured to accept the exterior heat sink portion.

18. The joint pack of claim 1 wherein the exterior heat sink portion is fastened to the first side panel from the interior side of the first side panel.

19. The joint pack of claim 1 further including a second side panel on a side of the busway joint pack opposite the first side panel, and
a second heat sink assembly for the joint pack having:
an interstitial heat sink portion sized to fit between the phase connector plates;
an exterior heat sink portion projecting beyond an exterior surface of the second side panel; and
the interstitial heat sink portion being thermally conductive to the exterior heat sink portion.

* * * * *